(12) United States Patent
Ristock et al.

(10) Patent No.: US 8,824,664 B1
(45) Date of Patent: Sep. 2, 2014

(54) SYSTEM AND METHOD FOR CONTROLLING LIFESPAN OF INTERACTION REQUESTS

(71) Applicant: Genesys Telecommunications Laboratories, Inc., Daly City, CA (US)

(72) Inventors: Herbert Willi Artur Ristock, Walnut Creek, CA (US); Yevgeniy Petrovykh, Walnut Creek, CA (US)

(73) Assignee: Genesys Telecommunications Laboratories, Inc., Daly City, CA (US)

( * ) Notice: Subject to any disclaimer, the term of this patent is extended or adjusted under 35 U.S.C. 154(b) by 0 days.

(21) Appl. No.: 13/917,550

(22) Filed: Jun. 13, 2013

(51) Int. Cl.
*H04M 3/00* (2006.01)
*H04M 5/00* (2006.01)
*H04M 3/523* (2006.01)

(52) U.S. Cl.
CPC ................................ *H04M 3/523* (2013.01)
USPC ................................ 379/266.03; 379/266.01

(58) Field of Classification Search
CPC ... H01M 15/56; H01M 3/5183; H01M 3/523; H01M 3/5238; H01M 3/5166; H01M 3/51
USPC .................. 379/266.01, 266.03, 265.09, 242
See application file for complete search history.

(56) References Cited

U.S. PATENT DOCUMENTS 8,687,558 B2 * 4/2014 Jackson et al. ................ 370/328
2011/0246518 A1 * 10/2011 Mehrotra et al. .............. 707/770

* cited by examiner

*Primary Examiner* — Thjuan K Addy
(74) *Attorney, Agent, or Firm* — Christie, Parker & Hale, LLP

(57) ABSTRACT

An apparatus for controlling lifespan of interaction requests includes a processor and a memory, the memory storing instructions that when executed by the processor cause the processor to detect when an interaction request is being initiated for send from a communications appliance, server, or system, activate an interface on the appliance, server, or system for configuring a time to live (TTL) for the interaction request, cause, via the configuration, the interaction request to expire if not answered within the TTL life span, and cause, via the configuration, the TTL constraint applied to the interaction request to be lifted if the interaction is answered within the TTL life span.

20 Claims, 5 Drawing Sheets

SYSTEM AND METHOD FOR CONTROLLING LIFESPAN OF INTERACTION REQUESTS

BACKGROUND

1. Field

The present invention is in the field of computer telephony integration (CTI) and pertains more particularly to methods and apparatus for controlling the life span of interaction requests in contact centers.

2. Discussion of the State of the Art

In the field of CTI telephony, contact centers exist mainly for the purpose of customer fulfillment relative to sales and service. State of the art contact centers are capable of managing communications over diverse channels including voice, messaging, and other Web-based communication such as chat, form submission, Web invitation, and link redirection, and more.

Currently, customers and potential customers of a contact center may abandon or terminate an interaction request if the request is a voice telephone request, a VoIP request, or a Web-based chat request, simply by terminating their end of the connection by hanging up or logging off the server. Such interaction abandonment occurs mainly when the customer has lost patience waiting in a queue for a response from the contact center system or agent. The option to abandon an interaction request is not available for other media channels managed by the contact center such as short messaging service (SMS), email, multimedia messaging service (MMS), or other asynchronous contact initiation methods using Web-based interfaces.

As for other multimedia interaction requests, agents may lose efficiency by processing many interaction requests where the sender is no longer interested and or has found another solution to the need defined in the original request.

Therefore what is clearly needed is a system that enables the originators of interaction requests to establish and control the time that an interaction request may be considered alive and can still be responded to by the contact center system or an agent of the contact center.

SUMMARY

In one implementation of the present invention, an apparatus is provided and includes a processor and a memory, the memory storing instructions that when executed by the processor cause the processor to detect when an interaction request is being initiated for sending from a communications appliance, activate an interface on the appliance for configuring a time to live (TTL) for the interaction request, cause, via the configuration, the interaction request to expire if not answered within a time period corresponding to the TTL, and cause, via the configuration, lifting of a constraint applied to the interaction request if the interaction is answered within the time period corresponding to the TTL.

In one implementation, the interaction request is of the form of a short message service (SMS) text message, a multimedia message service (MMS) message or an email message. In one implementation, the interaction request is inbound to a call center (CC) or outbound from the CC. In one implementation, the interface is a visual interface displayed on the appliance or an audio interface that accepts voice input. In one implementation, the interaction request is of the form of a voice call placed from a landline telephone, a cellular telephone, or a voice over Internet protocol (VoIP) application residing on a computing appliance adapted for VoIP telephony.

In one implementation of the invention, the interaction request is in the form of a Web form submission. In one implementation, the interaction request is of the form of activation of a Web link. In one implementation, the interaction request is encrypted and includes a unique electronic token that, when matched by a responding entity prior to TTL expiration, enables decryption of the request. In one implementation, grant of a decryption key relies on matching token presentation and TTL lifespan check, which failure of either condition causes denial of service. In one implementation, the TTL configuration may be updated, modified, or lifted as a constraint after the interaction request was sent.

According to one implementation of the present invention, a method is provided including detecting when an interaction request is being initiated for sending from a communications appliance, activating an interface on the appliance, configuring a time to live (TTL) for the interaction request, causing, via the configuration, the interaction request to expire if not answered within a time period corresponding to the TTL, and causing, via the configuration, lifting of a constraint applied to the interaction request if the interaction is answered within the time period corresponding to the TTL.

In one implementation of the method, the interaction request is of the form of a short message service (SMS) text message, a multimedia message service (MMS) message, or an email message. In one implementation, the interaction request is inbound to a call center (CC) or outbound from the CC. In one implementation, the interface is a visual interface displayed on the appliance or an audio interface that accepts voice input. In one implementation, the interaction request is of the form of a voice call placed from a landline telephone, a cellular telephone, or a voice over Internet protocol (VoIP) application residing on a computing appliance adapted for VoIP telephony.

In one implementation of the method, the interaction request is in the form of a Web form submission. In one implementation, the interaction request is of the form of activation of a Web link. In one implementation, the interaction request is encrypted and includes a unique electronic token that, when matched by a responding entity prior to TTL expiration, enables decryption of the request. In one implementation, grant of a decryption key relies on matching token presentation and TTL lifespan check, which failure of either condition causes denial of service. In one implementation, the TTL configuration may be updated, modified, or lifted as a constraint after the interaction request was sent.

DETAILED DESCRIPTION

In general terms, embodiments of the present invention are directed to a system and method that enables contact center customers to cancel multimedia communications with the center by controlling the lifespan of initiated communication requests. The present invention is described in enabling detail using the following examples, each of which may describe more than one relevant implementation falling within the scope of the present invention.

Figure 1:
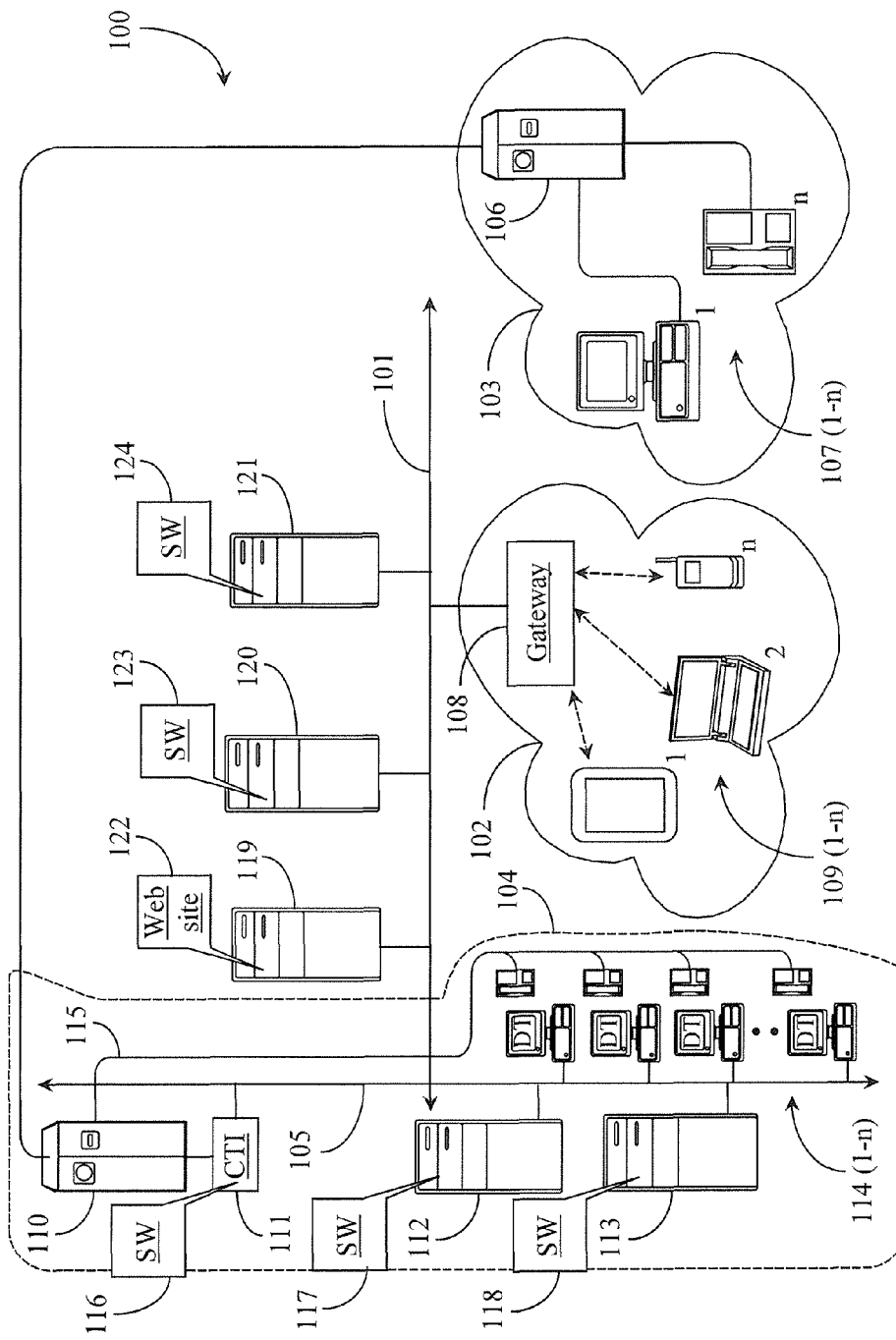
FIG. 1 is an architectural diagram of a communications network supporting customer-driven lifespan control of initiated interaction requests according to one implementation of the invention.

FIG. 1 is an architectural diagram of a communications network 100 supporting customer-driven lifespan control of initiated interaction requests according to at least one implementation of the invention. Communications network 100 may include the well-known Internet network represented herein by an Internet backbone 101. Internet backbone 101 may represent all of the lines, equipment, and access points that make up the Internet network as a whole, including any connected sub-networks. Therefore there are no geographic limitations to the practice of the present invention. Network 101 may also be a corporate wide area network (WAN), or a municipal area network (MAN) without departing from the spirit and scope of the present invention. The Internet network may be desirable, in one implementation, because of its high public access characteristic. Internet backbone 101 may also be referred to as Internet 101 in this specification.

A wireless communications carrier network 102 is depicted in this architectural implementation and may have connection to the Internet 101 through a multimedia gateway 108. Wireless network 102 may be a cellular telephony network such as a code division multiple access (CDMA), a time division multiple access (TDMA), or a global system for mobile communications (GSM) network without departing from the spirit and scope of the invention. Network 102 may also be a wireless fidelity (WiFi) or another wireless communications access network without departing from the spirit and scope of the invention.

A publicly switched telephone network (PSTN) 103 is depicted in this architectural implementation and may have a telephony network connection to a contact center represented herein as a contact center 104 enclosed by a broken boundary. PSTN 103 may also have connection to Internet 101 (not illustrated) through an Internet service provider company and a telephony-to-Internet protocol gateway. Methods of Internet access from PSTN network 103 may include dialup/modem, digital subscriber line (DSL), integrated services digital network (ISDN), cable/modem, or other. Customers of contact center 104 are represented herein as communications appliance 107 (1-n) in PSTN 103, and communications appliances 109 (1-n) in wireless carrier network 102.

Appliances 109 (1-n) may include a smart phone or iPad computing appliance 109 (1), a laptop computing appliance 109 (2), and a cellular telephone 109(n), or any other appliance enabled for Internet access. In one implementation, wireless carrier network 102 and PSTN network 103 are bridged (not illustrated) for seamless communication between networks and the Internet. Seamless communication between the Internet, a wireless sub-network, and the PSTN network is well established and well understood in the art. Such bridging components including gateways, switches, edge routers, and the like, and may not be specifically depicted in this architectural representation, but may be assumed present where applicable according to known art.

Contact center 104 may be a single contact center or a federation of multiple contact centers without departing from the spirit and scope of the present invention. A single contact center is represented in this implementation and is deemed sufficient for description of the present invention. Contact center 104 is further represented by a local area network (LAN) 105. LAN 105 may support contact center equipment and network-based communications and computer telephony integration (CTI). Contact center 104 may include a central office telephone switch 110 that may represent the last stop for incoming calls destined for agents and or services within the center. Switch 110 may be an automated call distributor (ACD), a private branch exchange (PBX) switch or some other type of telephone switch without departing from the spirit and scope of the present invention.

Telephone switch 110 is accessible from PSTN network 103 via telephone trunk from a PSTN telephone switch 106. Switch 106 may be comparable in description to switch 110 in contact center 104. Switch 110 in contact center 104 may be enhanced for routing and switching intelligence via a CTI processor 111. CTI processor 111 may have connection to switch 110 via a CTI link. LAN 105 may support CTI processor 111 in this implementation. Other telephony service features that may be provided at switch 110 may include interactive voice response services, agent level routing services, conferencing services, and so on.

Telephone switch 110 may connect to a plurality of telephones distributed throughout contact center 104 which may be connected to the switch by internal telephony wiring 115. In this architectural example telephones may also be LAN-connected telephones capable of IP telephony calls. LAN 105 in contact center 104 supports multiple agent workstations 114 (1-n). Agent workstations 114 (1-n) may include a LAN-connected computing appliance such as a desktop computer or terminal and an aforementioned telephone (PSTN or LAN-connected or both). In this example the agent computing appliances are desktop computers having display and communications capabilities. Each station may be supported by transaction and servicing software in the form of an agent desktop (DT) application that enables the agent to log into the contact center system and perform all related communications and transaction services.

LAN 105 may be connected to Internet network 101 on a continuous persistent basis or during scheduled work periods. Contact center 104 may maintain or make use of a Website 122 depicted herein as executing from a Web server 119 hosted on Internet 101. Website 122 may include customer access points such as embedded contact options for visiting customers like "call now" and "call me back". There may be login interface for returning customers. Chat, email, video, messaging, and other multimedia interfaces may also be provided for facilitating customer access and interaction with call center services, including redirection to other service Websites or pages within the same website. Web server 119 may include a processor, a data repository, and a non-transitory medium storing instructions and components for enabling functionality as a Web server. A third-party web hosting service may host web server 119 or it may be maintained by the contact center without departing from the spirit and scope of the present invention.

LAN 105 within contact center 104 may support various contact center components including but not limited to a routing server 112 and an outbound contact server 113. Other supported components may include an application server, a directory server, a statistics server, and a customer information system among others. According to one embodiment, a routing server and an outbound contact server are basic components utilized during the practice of the present invention.

Routing server 112 may include a processor, a data repository, and a non-transitory medium containing all of the instruction for enabling function as a routing server. Routing server 112 is intended to broadly represent routing capability that may include routing of voice calls, video calls, email, chat requests, and other types of interaction requests. In one implementation an interaction requests may be of the form of activating a Web link or universal resource locator (URL). It may be appreciated that there may also be separate dedicated routing systems for different media types or channels without departing from the spirit and scope of the present invention.

Outbound contact server 113 may include a processor, a data repository, and a non-transitory medium storing instructions necessary to enable function as an outbound contact server. Outbound contact server 113 is intended to broadly represent outbound contact capabilities of contact center 104 including telephone outbound calling, outbound email, messaging, and proactive Web outbound contact. Outbound contact may be used in sales campaigns, time-limited offers, special advertising, and more.

Internet 101 may support a resource server 120 and an authorization server 121. Resource server 120 may be hosted within the physical domain of contact center 104 and may be supported by LAN 105. In this implementation, resource server 120 is hosted on the Internet, but may still be maintained and controlled by contact center 104. Resource server 120 may be assumed to include a processor, a data repository, and a non-transitory medium storing all of the instructions required for enabling the functionality of a resources server. Resource server 120 in one implementation is intended to broadly represent any resources that may be owned by a customer and therefore might be accessed through permission given by the customer prior to access.

Resources may include files, data, and live or pending interaction requests. It will be appreciated by one with skill in the art that certain resources owned by customers of contact center 104 might be stored on different systems dependant upon the types or classes of resources without departing from the spirit and scope of the present invention. For example, customer shipping history may be stored separately from pending customer requests or orders for services.

Authorization server 121 may be hosted within the physical domain of contact center 104 and may be supported by LAN 105. In this implementation, authorization server 121 is hosted on the Internet, but may still be maintained and controlled by contact center 104. In one implementation, authorization server 121 is hosted by a third party authorization service enabled by OAuth protocols known in the art. Authorization server 121 may be assumed to include a processor, a data repository, and a non-transitory medium containing all instruction required for enabling the functionality of an authorization server. Authorization server 121 is intended to broadly represent service of authorization for any consumer seeking to access a resource such as by presenting a security token, for example. Authorization may include provision of a decryption key for decrypting encrypted resource files.

In use of the present invention, customers such as customers operating appliances 109 (1-*n*) and 107 (1-*n*) may have control over their contact center resources including any pending interactions by being empowered to set and manage lifecycle control of resource persistence within the contact center system. In one implementation, lifecycle control is focused on controlling lifespan or lifetime parameters, generally referred to herein as time to live (TTL) parameters, for documents, messages and other forms of resources including pending interaction requests. In voice telephony, a customer typically has control over the call. The customer may simply hang up if desired and the contact center will not have any records of the event except for the actual telephone number of the caller.

However, in some cases, incoming calls into switch 110 may be intercepted by voice services like IVR. IVR sessions might be recorded and therefore the customer might have provided solicited or other information that the contact center may retain even if the customer decides to hang up. The present invention may be applicable in such an implementation as will be described further below. In other media types like email, hypertext transfer protocol (HTTP) requests, Web form submissions and the like, the customer generally cannot control the lifespan associated with those requests nor the retention likelihood by the contact center of content associated with such requests originally sent into or forwarded to the contact center.

The invention uses an authorization procedure to allow third and first party access to resources considered owned by the customer including pending interaction requests of multimedia types that might be live and waiting in the system for contact center response. In one implementation, a customer such as a customer operating any of appliances 109 (1-*n*) or 107 (1-*n*) may access Web site register for resource lifecycle control as a service and may install a set of SW instructions from a non-transitory medium onto the sending appliance, the executing instructions enabling the customer to configure a time to live (TTL) for any interaction request sent from the appliance including one or more options for facilitating the state of the request depending upon actions of the recipient.

In one implementation, the customer may send an email to contact center 104 from an appliance such as 107 (1). After drafting the email body, the customer using an authorization service or technique may encrypt the message and create a decryption key that requires prior authorization to access. Decryption of the message may be tied to a constraint requiring the message to be selected and processed within the pre-configured TTL period assigned to the request by the customer.

In this implementation, the request for services from the contact center is classified as a customer resource and will remain encrypted unless it is processed within the TTL window. If the request is not opened before the TTL expires, then the decryption key may be permanently revoked (denial of service) rendering the request permanently non-legible. Another option may be to cause deletion of the message from queue or inbox if it is not processed within the time window set by the TTL parameter. If an agent of contact center 104 within the set TTL period opens the request, the center may, by presenting a token to an authorization server, obtain (through customer permission) a decryption key to decrypt the message and process it accordingly.

In one implementation, the capability of a customer to set and control TTL lifespan relative to interaction requests of various media types is server assisted, meaning that the customer does not require a standalone application but utilizes a server-based application provided through Web site 122 or by a third party service. Customer control over TTL lifespan of an interaction request may be extended to other forms of multimedia requests or contact methods. For example, a customer may access contact center services through Website 122 by pressing an interactive option for receiving a call back from the center. The customer might provide a summary or additional data explaining the intent of the customer regarding the request through a pop-up form associated with the callback request.

The customer name, telephone number, and summary of intent may be encrypted when received at the Website server before routing. When a process or live agent attempts to open the interaction event, it will be presented as a decrypted contact request only if the agent or process presented a token to retrieve the decryption key for the event within the required TTL window or "lifespan" pre-set by the customer (sender). The customer may also be referred to as the resource owner of the request and may have reason for not doing business with the center unless it might be concluded within the period of time set within the resource. In the case that the center did not respond within the time allotted by the customer, the customer may not want any further contact from the center. Therefore, the customer's identity, contact information and intent description may remain encrypted or the event might be deleted altogether leaving only a digital footprint such as a count number that the request even existed.

In other implementations such as voice over Internet protocol (VoIP) or IVR-assisted voice telephony, recorded voice data submitted by the customer as part of a request (call) or left message, is encrypted, and a call back must be initiated within the required lifespan of the event before the recorded audio can be understood by an agent or by a voice response system. In addition to text encryption and audio encryption, video may also be similarly encrypted such that the video of the caller may not be played or if played not deciphered by a human or optical recognition process such as face recognition. This implementation may also apply to video mail messages.

Embodiments of the present invention may also apply to outbound requests initiated by a contact center and sent to potential customers. In such scenarios, the roles of the resource owner and resource consumer may simply be reversed. In one example, the contact center may send an email to a customer advertising a special price for a product where the price depends upon customer response within a specific time period such as "today only". The center may configure a TTL for the message that activates automatically after send whereas if the customer attempts to open the message within the time window, the message opens and the offer may be read. If the customer attempts to open the message after the TTL expires, the message may not open, it may delete from the customer's inbox, or it may simply remain encrypted if it was encrypted in the first place. Encryption may be used in outbound requests depending upon the nature of the business, the class of customer marketed to, and other considerations.

CTI processor 111 includes SW 116 executing from as non-transitory medium on the device. SW 116 may contain instruction for enabling the invention relative to voice telephony and IVR intervention for events such as call backs, or for imposing special time limits for waiting in queue. For example, a customer might have a special token number that qualifies the customer for a special deal offered for a very limited time. The customer might interact with the IVR, present the token number and any add comments before being placed in queue. The pre-set TTL may be shorter than the expected wait time in queue relative to other callers attempting to access services.

The fact of pre-set TTL, or token number, or combination thereof, may cause priority treatment of the event in queue bumping it ahead of other callers. The TTL may be in the form of a time stamp with an expiration tag that is visible to the system and therefore might be used in routing of the call in a more time sensitive way. If an agent picks up the call during the time window allotted the agent and the customer may interact normally. However, if the TTL has expired by the time the agent is ready to take the call, it may drop out of queue or otherwise be abandoned or invisible to the agent. There are many visual indicators and features that may be incorporated to provide alerts, notifications, and to facilitate tracking of unsuccessful call attempts due to TTL expiration before contact center response is initiated.

Routing server 112 includes SW 117 executing from a non-transitory medium on the server. SW 117 is adapted to aid via extension or API the server programs to practice the present invention. For example, if it is known predictively, which agent is going to get a request event with a TTL limitation, the system may present the token on behalf of the target agent to obtain a decryption key so that the process does not have to be implemented from the agent station. In some implementations, the authorization process for a token allows for transfer rights so that the recipient may be granted certain permissions such as transferring the token to other services for use in other parts of a multi-step process such a transaction requiring the cooperation of more than one independent party. An example might be a sales service, a separate contract service, and a notary service. There are many possibilities.

Figure 2:
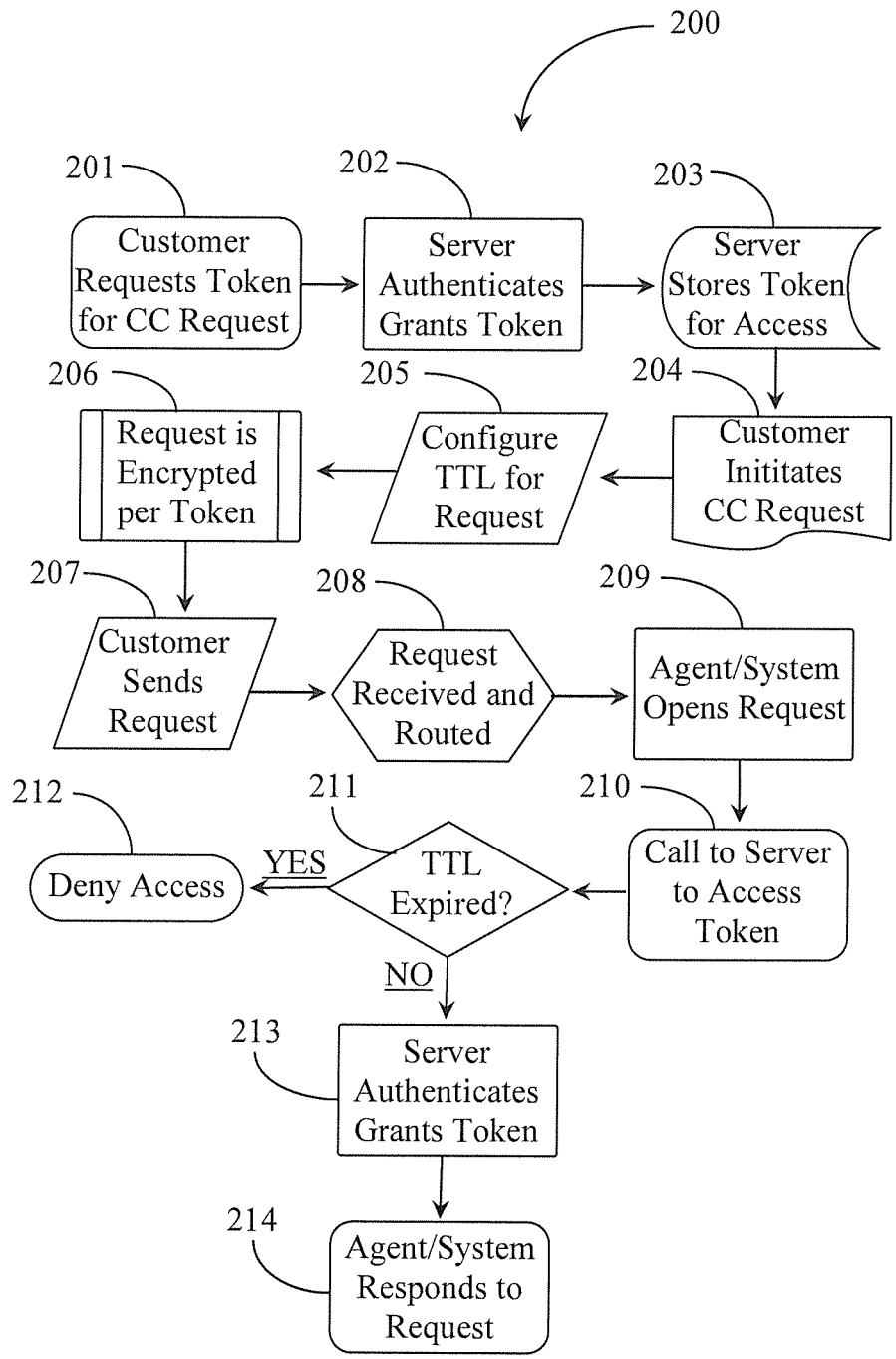
FIG. 2 is a process flow chart depicting acts for controlling lifespan of an interaction request into a contact center according to one implementation of the invention.

FIG. 2 is a process flow chart 200 depicting acts for controlling TTL of an interaction request into a contact center. At act 201, a customer may request token generation for an interaction request to be delivered to a contact center. The token may be generated at a third party server, or on the customer's sending appliance used to initiate and send the request event. The choice of whether the process is server-assisted or not may partly depend upon the type of media the request assumes. A token may be generated, for example, using a hashed combination of the customers name and email address, or other identification information. In one implementation of the invention, the token could be a simple web token composed of a list of name/value pairs encoded as character strings wherein the last pair is fixed to capture a hash-based message authentication code like OAuth hash-based message authentication code (HMAC) using a secure hash algorithm like secure hash algorithm (SHA) 256 signature computed over all of the token name value pairs using a shared secret between the resource owner and resource consumer or service provider, in this case the contact center.

In act 202, the server grants the customers request for a new token sending a copy to the customer for encrypting a message and storing a copy in act 203 for latter access and decryption of the message by a resource consumer that presents a valid token for authentication. In one implementation, SW executing from the customer's appliance with or without server assistance monitors the customer's communications applications on the sending appliance and automatically prompts for token services or if pre-configured, causes automatic generation and encryption via the token or a defined component thereof transparent to the user. In one implementation the decryption key is separate from the token and the key is granted based on token authentication.

At act 204, the customer initiates the contact center request that is subject to the token. In one implementation, a single token may be attached to more than one message sent to more than one recipient. During act 204, the customer may draft the request, record a request (audio, video) or may elucidate the request while in session with an IVR system wherein the token is obtained on the fly during the process.

In act 205, the customer may be prompted to configure a TTL lifespan for the interaction request. The TTL length of time might vary according to parameters surrounding the request such as time of day, time window to respond to an offer, or other factors. In one implementation, the system of the invention may draw to technologies such as Snapchat™ or Poke™ instituted by Facebook™ with some relaxation of constraints governing the actual time a TTL may have and whether it may be a custom process completely controlled by the customer. In one implementation TTL for a resource may be pre-set by pre-agreement between parties. In another implementation, the customer may arbitrarily assign TTL. In still another implementation, the resource consumer may assign TTL. In still another implementation a combination of the aforementioned conditions can be incorporated, for example a server assisting with TTL by providing time-based information to the customer at the time of TTL configuration.

In act 206, the interaction request may be encrypted for sending according to the generated token after the customer has previewed the message and is satisfied with the content. In act 207, the customer may send the message to the contact center. If the message is an email or other text message, the message body may be encrypted. In addition to the content, the service may allow the customer's contact information and identification to be encrypted as well from human discernment. In act 208, the request may be received encrypted and routed to a message queue, inbox, or other waiting queue. SW on the router, analogous to SW 117 on routing server 112 of FIG. 1 in the form of an API or extension to existing routing SW facilitates special treatment for handling token-encrypted interaction requests over other standard requests. For example, in an implementation where the resource owner (e.g., a contact center customer) generates a token and sends a token with the request, the routing system may forward the token to the resource server for later verification.

The TTL activation may be configured to start at a pre-determined event that may occur after sending the request. For example, TTL for a message might be activated only after it is routed and parked so it is visible to the system/agent. According to one embodiment, TTL activation may involve the starting of a clock. In one implementation TTL for the message activates automatically upon send. In still another implementation, the TTL may be tailored to normal server time and may be set to expire at a certain local time where the message is delivered. An example of this might be a TTL that expires when a sales office is closed.

In act 209, an agent or an automated system may open the request routed in act 208. The act of attempting to open the request may trigger an automated call to the resource server in act 210 to access a token-based decryption key required to decrypt and discern the request. In one implementation, the call made to the server includes a copy of the token for matching the server-stored copy. In one implementation, the decryption key may be obtained while the request in being routed to a designated agent or system. The resource server tracks the time assigned to the request and may deny access to the decryption key for the request in act 212 if the TTL has expired in act 211. If TTL is still relevant in act 211 (has not yet expired), the process may move to act 213 where the server may authenticate the token and grant access to the decryption key for decrypting the request. In one implementation the router passes the token attached to the queued interaction request automatically to the resource server (server call 210) before the request lands in queue. In this implementation, the routing target (agent/system) is already known so validation may occur without the agent or system necessitating a server call.

In act 214, the agent or system (resource consumer) having decrypted access to the interaction request (resource) sent by the customer (resource owner) responds to the request with the appropriate treatment. In one implementation, the interaction request remains decrypted and may be included in an interaction history log. The request may also be re-encrypted after processing and stored in the history in encrypted state. In act 213 in one implementation the decryption key may be assigned a TTL at issue that is shorter than the interaction request TTL such as a period of seconds to ensure that a key is not obtained and held by an agent or system without immediate indebt to decrypt and process the message.

In one implementation, an interaction request may be decrypted and processed where the appropriate treatment might be to reroute the request to another agent or system for processing. In such instances, a rule may allow the same token to be reused to re-encrypt the request with a fresh TTL and then obtain a new decryption key when the new agent or system attempts to open the request. It is noted herein that although a voice connection between a contact center and a customer may be terminated by the customer, perhaps with only the customer's telephone number and the time of the call recorded after the attempt. Therefore, it should be noted herein that in automated attendant systems like an IVR system, the contact center might record customer intent (voice, touchtone) and retain it along with the customer's name and contact data after the customer disconnects with the center.

In one implementation where IVR or other voice or touch-tone attendants are used to screen customer voice calls, those interaction requests may be encrypted (audio encryption) after the system records customer intent or touch tone input during IVR interaction with the caller. The system may assign a TTL to the encrypted request and the request may be decrypted again only within the assigned TTL window. If the TTL for a queued interaction event has expired after the caller was screened, but before the agent or other process could decrypt it, the request content and perhaps name and contact data of the caller might remain encrypted and might be deleted from the contact center system. An implementation for voice-based requests may be appropriate for customers who do not wish that their information be retained by any business if they have lost patience or simply decided to terminate a transaction in process.

Figure 3:
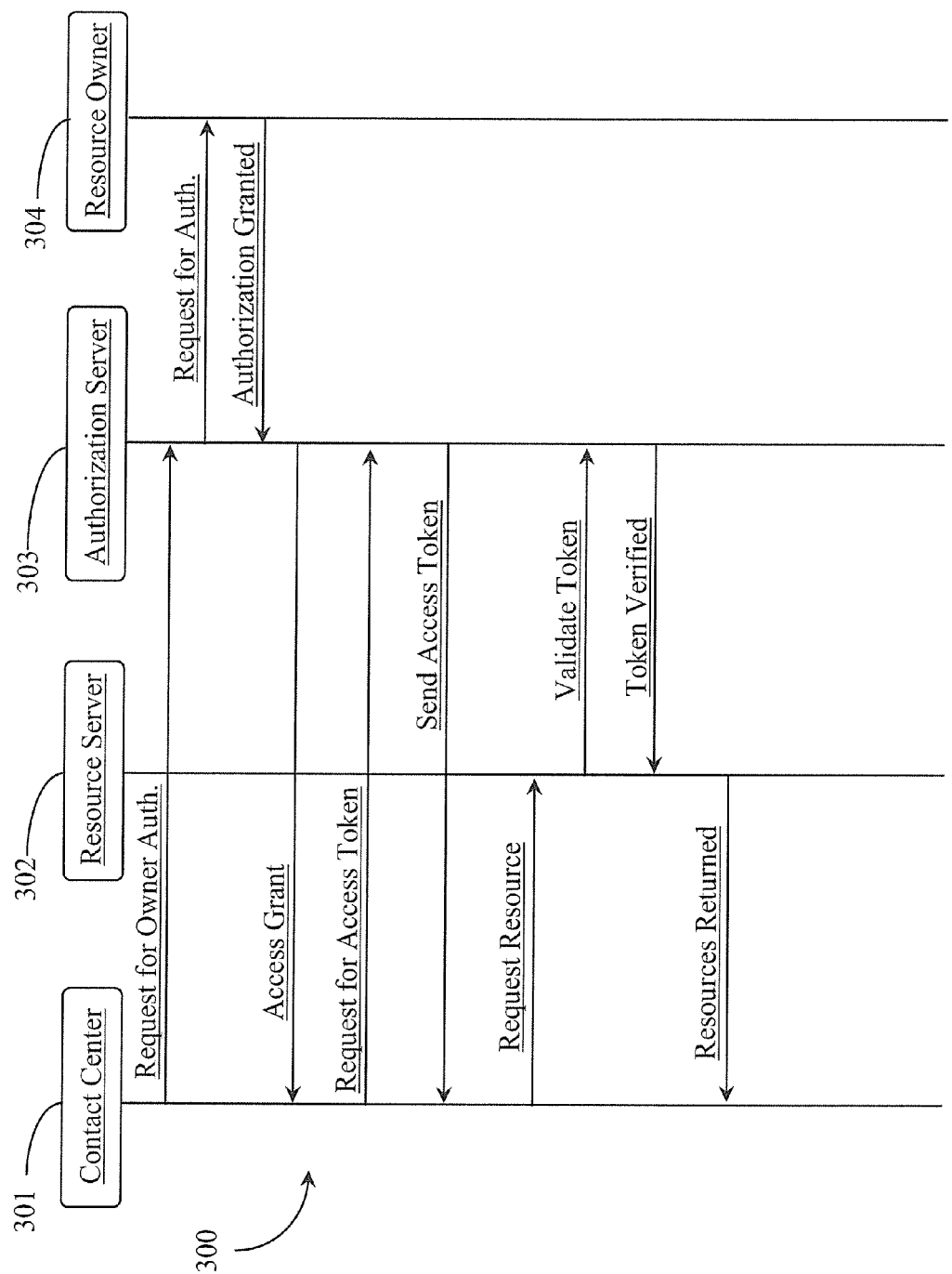
FIG. 3 is a sequence diagram depicting a sequence for gaining access to resources of a customer according to one implementation of the invention.

FIG. 3 is a sequence diagram 300 depicting a sequence for gaining access to resources of a customer. Diagram 300 depicts a contact center 301, a resource server 302, an authorization server 303, and a resource owner 304. Resource server 302 may contain a variety of customer-owned resources including prior transaction history, account information, order and shipping history, etc. Customer resource classification may be flexible enough to enable configuration of what may be classified as customer owned data or resources. In this implementation, interaction requests are classified as a customer-based resource requiring authorization to process. In one implementation, resource server 302 stores virtual entries representing actual customer interaction requests parked elsewhere in the system. In another implementation, the actual resource (interaction request) is held at the resource server and a reference pointing to the resource is sent to the recipient, in this case, the contact center.

A trusted third-party security provider may host authorization server 303. Resource owner 304 is analogous to a contact center customer or visitor owning, as a resource, at least the initial interaction request sent to the center. In one implementation, the contact center as a resource consumer may send a request (e.g. via one or more processors) to authorization server 303 for resource owner authorization in order to participate in token-based decryption of resources. In this implementation the contact center must authenticate with the authorization server, which in turn, must authenticate the resource owner. Authentication may include a shared secret between the intended resource consumer (contact center) and the resource owner (customer).

Once the resource owner is authenticated and has given permission to grant the resource consumer access to tokens, the authorization server may pass the access grant to the contact center. The contact center (e.g. via one or more processors) may then request an access token from the authorization server for the purpose of decrypting an interaction request. The contact center may then (e.g. via one or more processors) present the token to the resource server in a request to process the resource. The resource server may then validate the received token with the authorization server. If the token is verified, the resource(s) are decrypted and accessible to the contact center agent or system. If the TTL assigned to the token is expired, the server may deny access to the contact center. For example, expiration of the token may be based upon comparing the TTL against a current time. If the TTL has not expired and the token was verified, the time period that the token may be used to decrypt the resource may be constrained to a short period, perhaps seconds, to ensure immediate use. If the token use period expires, the contact center may be required to access the token again and repeat the authentication process.

The basic structure of a token in this implementation may include a unique token identifier, and the credentials of the resource owner (customer). The structure may also include the issuers chain of certificates or pointers thereto, a signature algorithm, identification of an authorized resource consumer (contact center), and method of authentication and strength of the authentication method. The token structure may further include the recipient identification (resource server ID), a list of resources and access rights, a TTL expiration time, the maximum number of times the token might be reused, and the degree of transferability, if any, of the token.

In one implementation, a token may be transferred from resource consumer to resource consumer and potentially reused to access one or more resources. An authorization token that has been transferred may include the old token the previous consumers certificate chains, the new consumer ID, and a list of downgraded scope fields. In both cases, the authorization signature may be computed with the issuer's private key or by a shared secret.

Figure 4:
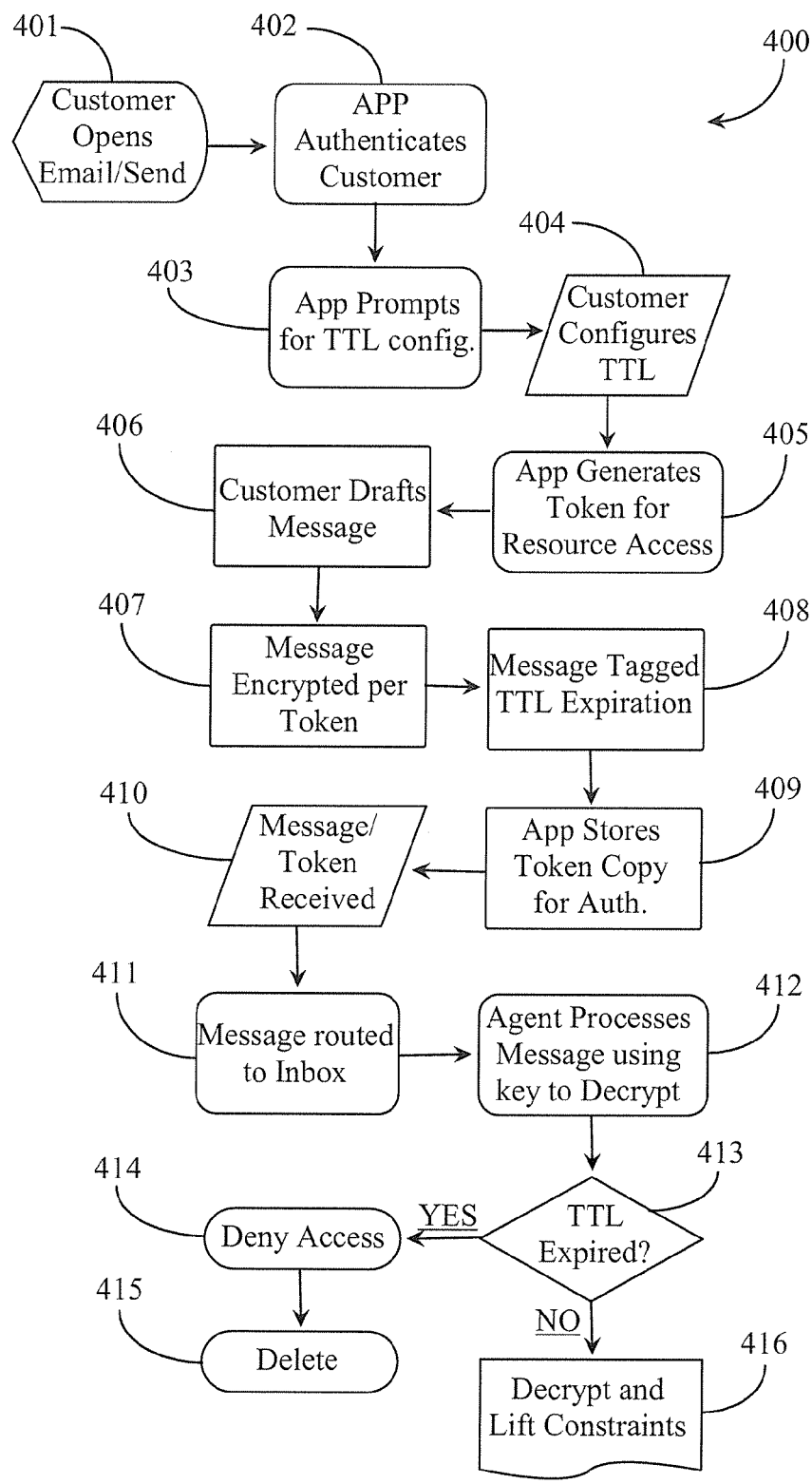
FIG. 4 is a process flow chart depicting acts for configuring time to live (TTL) for an interaction request from the sending appliance according to one implementation of the invention.

FIG. 4 is a process flow chart 400 depicting acts for configuring time to live (TTL) for an interaction request from the sending appliance. In one implementation, the resource owner or customer generates token from the same appliance used to initiate interaction requests. In this implementation, the customer may have SW that may be server-assisted installed on the sending appliance and pre-configured by extension or API to the communications applications residing on the customer appliance.

In act 401, the customer may open a communications application such as email with the intent of sending an interaction request encrypted with access authorized by token. Within the email application, certain contacts may be pre-configured as token-based recipients. The process may be semi-automated or fully automated. In act 402, the application may authenticate the customer with an authorization server. The customer may select a recipient (pre-configured) from an email contact list or if the contact is new, the customer may indicate or add the contact to recipients of token-based communications.

In act 403, the application may prompt the customer for configuring TTL for a new token governing access to the message. In one implementation TTLs might be suggested based on prior experience or based on current response times or conditions. In other implementations a TTL may be tied to a closing time, a customer's itinerary, or some other constraint. In act 404, the customer may configure the TTL for response to the message. In one implementation, the message is a voice message (MMS) that might be encrypted and tagged with a TTL. In another implementation, the message is a Flex Connect™ request via a presence service the request having encrypted contents attached.

In act 405, the application generates a new token for resource access, the resource being the interaction request the customer is drafting. The new token will specify the token recipient, which should also be authenticated at the server. The TTL may govern encryption/decryption capabilities with options for message deletion, archiving (in encrypted state), and other treatments that might be available relative to the message once it is opened.

In one implementation there may be more than one agent or entity working with a resource where multiple parties have different trust levels and therefore may only "see" or have access to parts of the customer resource that are associated with that trust level. For example, during a conference call discussing a pending surgery to be performed on a patient, a doctor may have higher set privileges than a nurse practitioner, which would have higher privileges than the anesthesiologist, which would have higher privileges that the receptionist scheduling the surgery for a customer. In another implementation for outbound contact customers may receive proactive messages, ads, or other solicitations where multiple recipients (customers) have different levels of trust or privilege that may entitle them upon authorization to "see" certain portions of a resource but not all of a resource, or "see" certain resources but not all resources in a grouping of resources.

The customer may draft the message in act 406. The customer may preview the drafted message and may provide indication of satisfaction with the message version before encryption of the message occurs. In act 407, the message may be encrypted using the token encryption method and key or shared secret. In act 408, the token may be tagged with the TTL expiration date and time so that it is indicated in the message and known by the token. In this way, a recipient may know the time allotted for message response. In act 409, the authentication server may store a copy of the token for later authentication service purposes.

In act 410, the message and token (attached) may be received at the contact center and routed by a message routing system or message router in act 411. In one implementation, the message router may route all emails to their intended recipient inboxes. In another implementation, the messages may be routed to a general email queue to be shared by a number of agents. The scope of the token authentication relative to recipient may define certain departments of the contact center, but not other departments. Authentication may be restricted to certain individuals only. There are variable options.

In act 412, a live agent (in this case) may select the message and process the message. In this act, the agent may present the token to the resource server (domain=queue) in order to access the message and decrypt the message for view using a decryption key passed to the agent during the session with the authorization server. This process may be automated and may be transparent to the agent. An extension or API may be installed on the agent's desktop sales application to perform the token presentation. The resource server may in turn validate the received token with the authentication server to get the decryption component (key) portion associated with the token to decrypt the message.

Upon token presentation, the authentication server may determine whether or not the TTL assigned to the message has expired in act 413. If in act 413, the TTL associated with the message response options is expired, the server may deny access to the message in act 414. In one implementation, access denial implies that the center may not process this request or retain any information about the request other than perhaps, an event number for reporting purposes. In act 415, the message may be deleted from the system without being processed. The customer may be informed about the state of processing of the message where access was denied so that the customer may determine if they wish to retry. In one implementation, the only record of the message for which access was denied might be a message id number, and the date and time it was received, and the amount of time it lived before expiring. Such data may aid the contact center to improve or adjust future response capabilities relative to such messages.

If it is determined that the TTL for the message has not expired in act 413, the authorization server may serve the decryption key to decrypt the message for processing in act 416. In one implementation, a decrypted message remains decrypted and becomes part of the customer record. In one implementation, a decrypted message is re-encrypted after successful processing and archived in a state of encryption.

Figure 5:
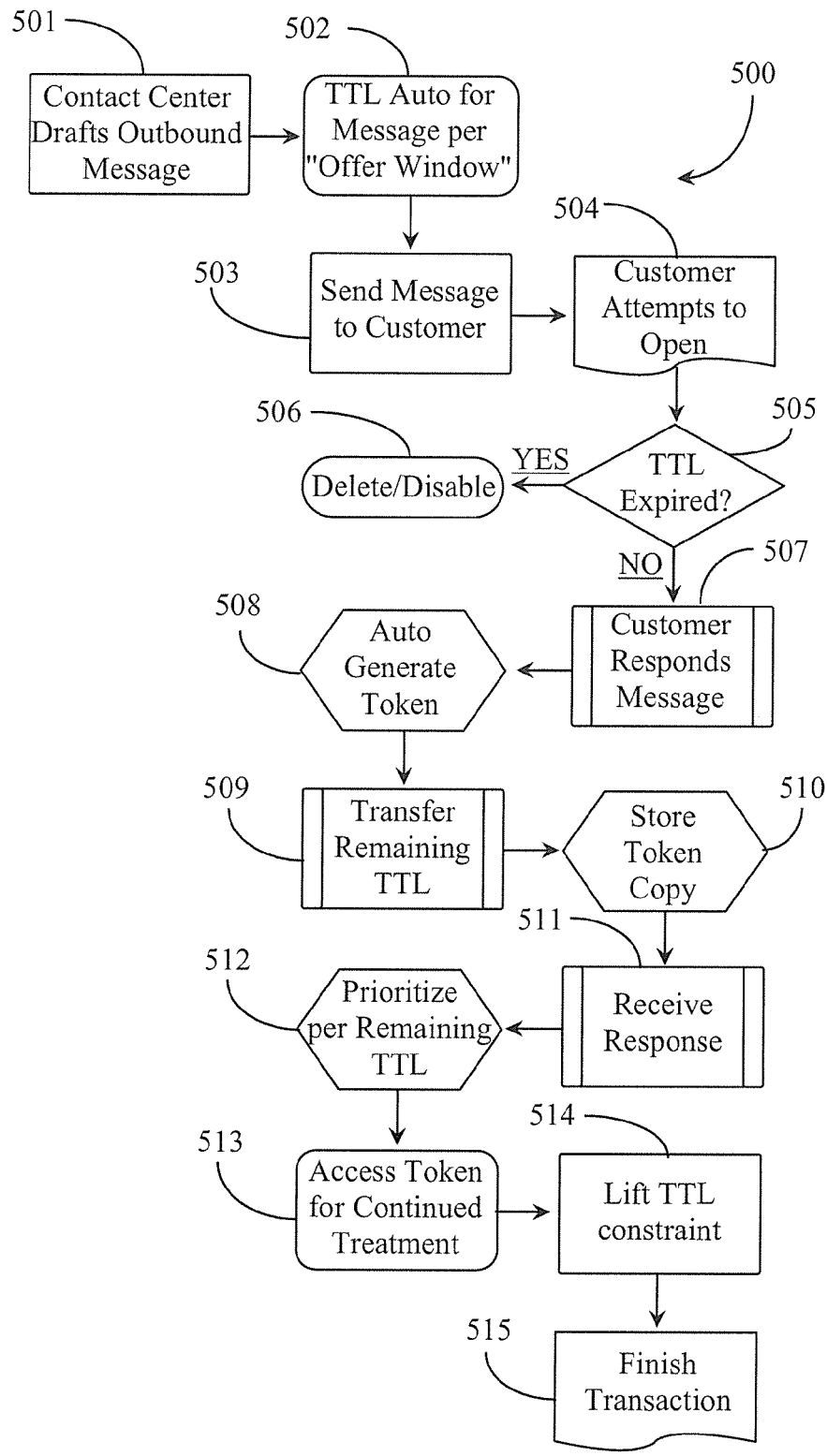
FIG. 5 is a process flow chart depicting acts for controlling lifespan for an interaction request outbound from a contact center according to one implementation of the invention.

FIG. 5 is a process flow chart 500 depicting acts for controlling lifespan for an interaction request outbound from a contact center. In this implementation, a contact center may draft an outbound message to a customer at act 501 to solicit an interaction from the customer based on some form of advertisement (outbound campaign, or proactive contact services). The outbound server may configure a TTL for the message automatically in act 502. The TTL may be set according to any current contact center state. The TTL may be, for example, a span of time beginning at send and ending at the planned expiration date of a special pricing or discount associated with an offer of a product or service.

In act 503, the outbound server sends the message to the customer. In this implementation, the message is a text message like an email, an SMS or MMS message. In another implementation, the message may be a proactive alert or notification sent to a customer visiting the contact center Website or an invitation like a chat invitation or a call today advertisement that might pop up when the customer is visiting any site associated with the contact center. In this implementation, it may not be important that the outbound message be encrypted because it is an advertisement. However, it may be important to the center that late responses (past TTL) not enter the incoming workflow stream of the contact center.

In act 504, the customer may attempt to respond to the message received. The TTL expiration time may be advertised or (tagged) to the message informing the customer of a limited time to respond. At step 504, the customer may be required to present a token to a resource server to access the message. While the message may not be encrypted, the token may simply ensure that the person opening the message is the intended recipient of the message. In this implementation, the resource server may verify the token to enable the message to be processed by the customer.

At act 505, the authorization server may determine whether the TTL associated with the message has expired. If it is determined in act 505 at the time the customer attempts to open the message that the TTL has expired, the message opening might be disabled and/or the message may be deleted from the customer's inbox, or browser. If it is determined at act 505 that the TTL has not expired, the customer may respond to the message in act 507. In one implementation, the customer's appliance aided by software extension or API may auto generate a new token in act 508 that includes all of the data from the old token. The system may transfer the remaining TTL from the old token to the new token in act 509. This might simply be a way to preserve the original TTL associated with an offer of a "sale" or "discount" on the offered product or service.

At act 510, the authorization server (server assisted) may store a copy of the new token sent in response to the original message. The response message may be encrypted to protect the identity information about the customer. In act 511, the contact center may receive the response or reply message from the customer with the new token. In act 512, the contact center may (e.g. via one or more processors), prioritize the response message in queue or routing according to the remaining TTL. At act 513, the contact center may (e.g. via one or more processors) be required to present the new token in order to process the customer's response for continued treatment. Once the contact center is authorized to access the customer's response message, the TTL constraint may be lifted in act 514. In act 515, the contact center (e.g. via one or more processors) may finish the transaction.

In one implementation, the token is transferable to designated entities that might be involved in a transaction process, for example, each entity involved in the transaction may be required to present a token for authentication before they can initiate their portion of the whole transaction. This may ensure that all service parties are legitimate and performing the required processes involved in servicing the customer.

It will be apparent to one with skill in the art of token-based security that by separating token creation and transfer capability from a hyper text transfer (HTTP) redirection scheme, the token may be generated by the resource owner at any time and may be prepared in advance by resource owners. In one implementation, a customer's resources may be categorized according to a hierarchy where minimal resources might be owned by the agent's log in application. For example, the agent may be issued a token for accessing certain customer resources when the agent successfully logs into the contact center system. The token might be valid until the agent logs out at which time the token may be revoked.

A different contact center process such as the application that monitors interactions may own any interaction objects created (call records) that are deleted from view when the transaction is complete, in one implementation. In this implementation, the monitoring or logging application may issue tokens as a resource owner to any other contact center resource consumer application that has a right to process or view the records. This implementation may aid in multi-tenant call centers to ensure that the appropriate entities (applications) are registered with a central authorization server to have token-based access to the appropriate customer resources.

It will be apparent to one with skill in the art that the token-based resource access system of the invention may be provided using some or all of the mentioned features and components without departing from the spirit and scope of the present invention. It will also be apparent to the skilled artisan that the implementations described above are specific examples of a single broader invention that may have greater scope than any of the singular descriptions taught.

What is claimed is:

1. An apparatus comprising:
a processor; and
a memory, the memory storing instructions that when executed by the processor cause the processor to:
detect when an interaction request is being initiated for sending from a communications appliance;
activate an interface on the appliance for configuring a time to live (TTL) for the interaction request;

cause, via the configuration, the interaction request to expire if not answered within a time period corresponding to the TTL; and cause, via the configuration, lifting of a constraint applied to the interaction request if the interaction is answered within the time period corresponding to the TTL.

2. The apparatus of claim 1 wherein the interaction request is of the form of a short message service (SMS) text message, a multimedia message service (MMS) message or an email message.

3. The apparatus of claim 1 wherein the interaction request is inbound to a call center (CC) or outbound from the CC.

4. The apparatus of claim 1 wherein the interface is a visual interface displayed on the appliance or an audio interface that accepts voice input.

5. The apparatus of claim 1 wherein the interaction request is of the form of a voice call placed from a landline telephone, a cellular telephone, or a voice over Internet protocol (VoIP) application residing on a computing appliance adapted for VoIP telephony.

6. The apparatus of claim 1 wherein the interaction request is in the form of a Web form submission.

7. The apparatus of claim 1 wherein the interaction request is of the form of activation of a Web link.

8. The apparatus of claim 1 wherein the interaction request is encrypted and includes a unique electronic token that, when matched by a responding entity prior to TTL expiration, enables decryption of the request.

9. The apparatus of claim 1 wherein grant of a decryption key relies on matching token presentation and TTL lifespan check, which failure of either condition causes denial of service.

10. The apparatus of claim 1 wherein the TTL configuration may be updated, modified, or lifted as a constraint after the interaction request was sent.

11. A method comprising:
  detecting, by a processor, when an interaction request is being initiated for sending from a communications appliance;
  activating, by the processor, an interface on the appliance for configuring a time to live (TTL) for the interaction request;
  causing, via the configuration, the interaction request to expire if not answered within a time period corresponding to the TTL; and
  causing, via the configuration, lifting of a constraint applied to the interaction request if the interaction is answered within the time period corresponding to the TTL.

12. The method of claim 11 wherein the interaction request is of the form of a short message service (SMS) text message, a multimedia message service (MMS) message, or an email message.

13. The method of claim 12 wherein the interaction request is inbound to a call center (CC) or outbound from the CC.

14. The method of claim 12 wherein the interface is a visual interface displayed on the appliance or an audio interface that accepts voice input.

15. The method of claim 12 wherein the interaction request is of the form of a voice call placed from a landline telephone, a cellular telephone, or a voice over Internet protocol (VoIP) application residing on a computing appliance adapted for VoIP telephony.

16. The method of claim 12 wherein the interaction request is in the form of a Web form submission.

17. The method of claim 12 wherein interaction request is of the form of activation of a Web link.

18. The method of claim 12 wherein the interaction request is encrypted and includes a unique electronic token that, when matched by a responding entity prior to TTL expiration, enables decryption of the request.

19. The method of claim 12 wherein grant of a decryption key relies on matching token presentation and TTL lifespan check, which failure of either condition causes denial of service.

20. The method of claim 12 wherein the TTL configuration may be updated, modified, or lifted as a constraint after the interaction request was sent.

* * * * *